3,067,267
CONVERSION OF BIS(2-CHLORO-ETHYL) ETHER TO CHLORINATED HYDROCARBONS
David M. Young and David N. Glew, Sarnia, Ontario, Canada, assignors to The Dow Chemical Company, Midland, Mich., a corporation of Delaware
No Drawing. Filed Aug. 4, 1958, Ser. No. 753,108
4 Claims. (Cl. 260—657)

This invention concerns a method for making chlorinated hydrocarbons of the group of ethylene dichloride, 1,1,2-trichloroethane and carbon tetrachloride from bis-(2-chloroethyl) ether.

Bis(2-chloroethyl) ether is an unreactive compound for which there is a limited demand. It arises as a by-product in the manufacture of ethylene glycol by the chlorohydrin process. This by-product represents an investment in terms of ethylene and chlorine. It also presents a disposal problem. Earlier attempts to dispose of it by burning resulted in severe corrosion damage to plant.

It has now been discovered that this by-product can be converted to useful products by simultaneous reaction with a concentrated or anhydrous ether-cleaving agent such as concentrated sulfuric or hydriodic acids or oleum and with a chlorinating agent, in particular giving ethylene dichloride, 1,1,2-trichloroethane and carbon tetrachloride. The reaction apparently involves a cleavage of the ether linkage and simultaneous chlorination. It is accomplished by heating bis(2-chloroethyl) ether at temperatures between 80° and 150° C. with at least an equimolar proportion of an ether-cleaving agent, e.g., concentrated or anhydrous sulfuric or hydriodic acids or oleum in the presence of at least an equimolar proportion of a chlorinating agent, e.g., hydrogen chloride, chlorine, chlorosulfonic acid, sulfuryl chloride, thionyl chloride, or pyrosulfuryl chloride. The degree of chlorination and amount of chlorinated product are dependent in part upon the time of reaction, which can be varied between about 1 and 24 hours and the temperature of chlorination.

The cleaving and chlorination of the bis(2-chloroethyl) ether are carried out with concentrated (at least 50 weight percent $H_2SO_4$) or fuming sulfuric acid or $SO_3$ together with chlorine or hydrogen chloride; with concentrated hydrochloric acid and potassium iodide, hydriodic acid being generated as ether-cleaving agent; with chlorine, hydrogen chloride, chlorosulfuric acid, sulfuryl chloride, thionyl chloride or pyrosulfuryl chloride dissolved in sulfur trioxide or in fuming sulfuric acid or in sulfuric acid containing not less than 50 weight percent of $H_2SO_4$; or with hydriodic acid (per se or generated in situ) together with one of the indicated chlorinating agents.

In practice, the bis(2-chloroethyl) ether is heated in admixture with an ether-cleaving agent in a reactor to temperatures between 80° and 150° C., and chlorine or one of the other equivalent chlorinating agents is continuously added in amount and for a time sufficient to give the desired product. A simple test run suffices to indicate the time for a given combination of reactants at a given temperature. Effluent gas from the reactor is cooled, advantageously in a cold trap at −30° C., to condense and recover crude product and to prevent excess chlorine from condensing. The crude product is washed with aqueous 2-normal NaOH or equivalent base to remove dissolved chlorine and $SO_2$ or $SO_3$, and the resulting organic layer containing purified chlorinated hydrocarbons is separated from the aqueous layer, advantageously by means of a separatory funnel.

The following examples are given in illustration and not in limitation of the invention, which is defined in the claims.

*Example 1*

A quantity of 60 grams of bis(2-chloroethyl) ether (98 percent pure) and 400 grams of 30 percent oleum was heated to and maintained at 100° C. Chlorine was then bubbled continuously through the mixture. The effluent gas stream was passed through a trap at −30° C. After a reaction time of 5 hours, passage of chlorine was halted and the crude product condensed in the trap was allowed to warm up to room temperature. The crude product, which weighed 18 grams, was washed with 2-normal NaOH to neutralize acidic impurities and an organic layer consisting of purified product was analyzed by infrared spectroscopy. The product contained 63 weight percent ethylene dichloride and 37 percent of 1,1,2-trichloroethane. Continued passage of chlorine at a reaction temperature of 100° C. for an additional 7½ hours gave an additional 8 grams of crude product which was processed as above to recover a chlorinated mixture containing 32 weight percent ethylene dichloride, 58 percent 1,1,2-trichloroethane and 10 percent carbon tetrachloride. An additional chlorination for 7½ hours gave 2.5 grams more of chlorinated hydrocarbon product.

*Example 2*

A quantity of 122 grams of bis(2-chloroethyl) ether (98 percent pure) and 200 grams of 30 percent oleum were mixed together and HCl gas was passed through the mixture, the temperature being maintained at 100° C. The effluent gases were led through a trap maintained at −30° C. After passage of HCl gas for three hours, therewas recovered from the trap 7 grams of a colorless liquid which was washed with aqueous 2-normal NaOH to remove dissolved acid gases. The purified product was shown by infrared spectroscopy to have the following composition (percent by weight):

Ethylene dichloride ------------------------------ 90
1,1,2-trichloroethane ---------------------------- 8
Chloroform --------------------------------------- 2

What is claimed is:

1. A method for making chlorinated aliphatic hydrocarbons having up to 2 carbon atoms per molecule by reacting bis(2-chloroethyl) ether at temperatures between 80° and 150° C. with at least an equimolar proportion of an ether-cleaving agent and in the presence of at least an equimolar proportion of a chlorinating agent.

2. A method for making chlorinated aliphatic hydrocarbons having up to 2 carbon atoms per molecule by reacting bis(2-chloroethyl) ether at temperatures between 80° and 150° C. with at least an equimolar proportion of an ether-cleaving agent of the group consisting of concentrated and anhydrous sulfuric acid, $SO_3$, oleum and hydriodic acid and in the presence of at least an equimolar proportion of a chlorinating agent of the group of chlorine, hydrogen chloride, chlorosulfonic acid, sulfuryl chloride, thionyl chloride and pyrosulfuryl chloride.

3. A method for making a mixture consisting of ethylene dichloride, 1,1,2-trichloroethane and carbon tetrachloride by reacting bis(2-chloroethyl) ether at 100° C. with a molar excess of 30 percent oleum and in the presence of a molar excess of chlorine, based on the amount of bis(2-chloroethyl) ether reactant.

4. A method for making a mixture consisting of ethylene dichloride, 1,1,2-trichloroethane and chloroform by reacting bis(2-chloroethyl) ether at 100° C. with a molar excess of 30 percent oleum and in the presence of a molar excess of hydrogen chloride, based on the amount of bis(2-chloroethyl) ether reactant.

References Cited in the file of this patent

UNITED STATES PATENTS 2,218,018   Cass _____ Oct. 15, 1940

OTHER REFERENCES

Suter et al.: Journal of the American Chemical Society, volume 60, 1938, pages 536–7 relied on.